July 16, 1963
E. J. PEHAM ETAL
3,097,447
BICYCLE NOISE MAKER
Filed Dec. 14, 1959
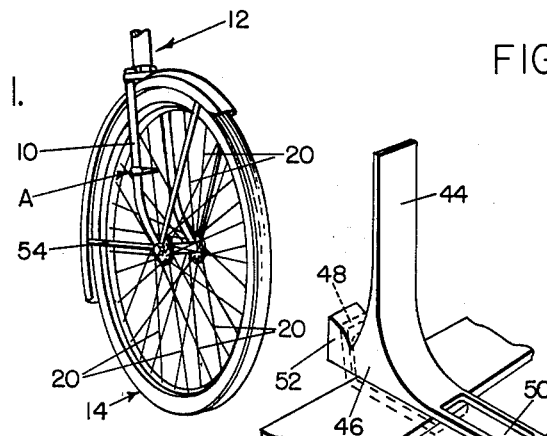
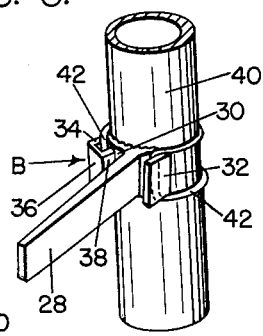
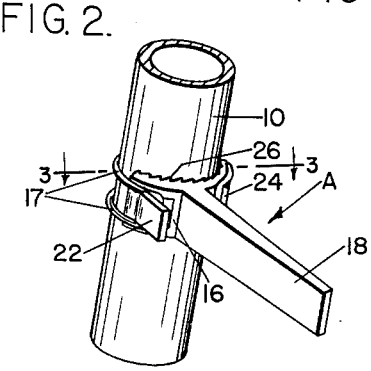
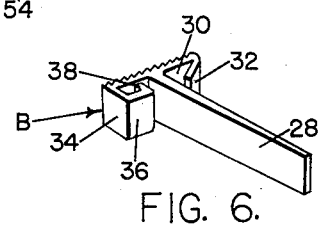
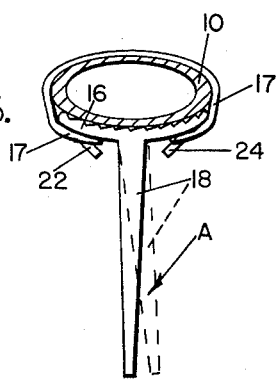
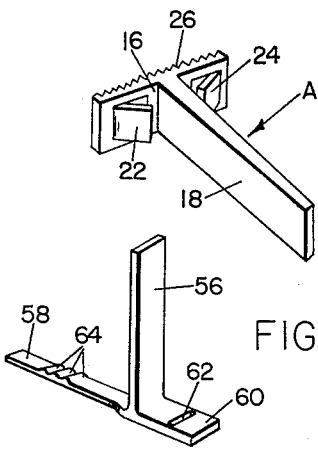
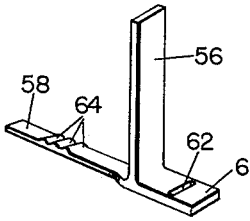
INVENTOR;
ENGELBERT J. PEHAM.
JOHN A. PEHAM
BY Robert M. Dunning
ATTORNEY United States Patent Office 3,097,447
Patented July 16, 1963

3,097,447
BICYCLE NOISE MAKER
Engelbert J. Peham and John A. Peham, St. Paul, Minn.
Filed Dec. 14, 1959, Ser. No. 859,500
2 Claims. (Cl. 46—175)

This invention relates to a novelty toy to be attached to vehicles having spoked wheels such as bicycles, tricycles and the like and deals particularly with an attachment for producing a noise simulating a motor-voice.

Therefore, the primary object of this invention is to provide an attachment to be mounted on the frame of a bicycle or the like adjacent to one of the wheels and which is actuable by the spokes of the wheel as the vehicle travels.

A feature of this invention lies in the provision of a noise making attachment which is extremely simple to mount and demount and which, when mounted, is securely and effectively fastened against displacement.

Another feature of this invention resides in the provision of a frame engaging surface on the base which is serrated to more effectively grip the frame and thereby be more secure against displacement. A further feature of this invention resides in the fact that attaching elements may be integral with a base portion of the device and that various clamping elements such as a rubber band, string, or wire may be utilized to effectively service the device to a vehicle frame.

An additional feature of this invention resides in the provision of a noise making device which may be economically manufactured such as by extruding and which may be formed of a relatively inexpensive resilient material such as plastic.

Other features and advantages will appear from the following description taken in connection with the drawings wherein:

FIGURE 1 is a perspective view of a spoked wheel and the adjunct frame parts of a vehicle such as a bicycle showing the noise making attachment in a position of use.

FIGURE 2 is an enlarged perspective view of one form of the device showing the manner in which it is attached to a vehicle frame.

FIGURE 3 is an enlarged plan view partially in section, view being taken on line 3—3 of FIGURE 2.

FIGURE 4 is a perspective view of an unmounted device of the form shown in FIGURES 1, 2 and 3.

FIGURE 5 is a perspective view of a modified form of the noise making device showing the manner in which it is attached to a vehicle frame.

FIGURE 6 is a perspective view of the unmounted device as shown in FIGURE 5.

FIGURE 7 is a perspective view of an additional embodiment of the noisemaker shown attached to a fender bracket of a vehicle.

FIGURE 8 is a perspective view of a further embodiment of the noise-maker.

With reference to the device as shown in FIGURES 2, 3, and 4, the embodiment shown therein is generally indicated by the letter A and is adapted to be attached to the fork or frame portion 10 of a bicycle 12 having a spoked wheel 14.

As is best shown in FIGURE 4 the device includes a base portion 16 which is substantially rectangular in plan. One side of the base 16 is provided with a vibrating resilient noise producing reed or finger 18 which extends at substantially a right angle from the base into the path of rotation of the spokes 20 of the wheel 14.

The device A is clamped to the fork or frame 10 by providing tabs 22 and 24 struck from the base portion 16. These tabs are designed to engage a rubber band 17 or other similar clamping elements and to encircle the frame 10 as is best seen in FIGURE 2.

The device A is preferably formed of a resilient material such as a polyethylene plastic since the base 16 must have sufficient flexibility to conform to the shape of the frame 10. The same flexibility is desirable in the formation of the reed or finger 18 since it must flex somewhat as each spoke passes it. The finger 18 must also possess sufficient resistance to the movement of the spoke since this resistance and the force with which the finger returns to an unflexed position are what creates the noise as each spoke passes the finger.

The side of the base opposite the side from which the finger extends is provided with a serrated surface 26 to impart added resistance to the turning of the device A on the frame 10.

In reference to the modification shown in FIGURES 5 and 6 the embodiment shown therein is generally indicated by the letter B and is virtually identical with the embodiment shown in FIGURES 1, 2, 3 and 4 with the exception of the manner in which it is attached to the vehicle frame.

The device B comprises a T-shaped body including a finger and a base. The finger 28 is connected midway between the ends of the base portion 30. The base 30 is provided at one end with a flange 32 which is bent to converge toward the finger 28 as is clearly shown in FIGURE 6. The opposite end of the base is provided with a right angular flange 34 which in turn supports a second right angular flange 36 generally parallel to the base. The portion 36 extends toward the finger 28 and is provided with a terminal flange 38 which extends toward the base and ends in spaced relation thereto.

In attaching the device B to the frame 40, one end of an endless clamping element 42 formed of a metallic wire or other suitable material is passed between the edge of the flange 38 which will flex sufficiently to allow such passage. The base 30 is flexed sufficiently so that the portion 34 may be engaged by the other end of the clamping element thereby securing the device to the frame.

When the embodiment B is demounted the end portion 32 is flexed towards the base sufficiently to disengage the end of the clamping wire 42. The end of the clamping element which is engaged in the pocket formed by the flanges 34, 36, and the terminal flange 38 will be retained therein when the device is not in use.

Further modifications of the noise making device are illustrated in FIGURES 7 and 8. Embodiment C illustrated in FIGURE 7 includes a resilient finger 44 and a base portion 46. A tongue 48 formed integrally with said base extends outwardly on one side of the finger 44. An elongated aperture 50 is disposed through the tongue and is designed to engage a hook-like projection 52. The projection 52 is formed integrally with said base and extends from the base on the opposite side of the finger from which the tongue 48 extends. The broken lines in FIGURE 7 illustrate the position of the tongue when it is looped around a portion of the fender bracket.

All of the embodiments illustrated in the present invention may be mounted on and attached to either a portion of the fork such as is indicated by the numerals 10 and 40 or a portion of the fender bracket 54.

Embodiment D illustrated in FIGURE 8 includes a generally T-shaped configuration including a finger 56 having opposite right angularly extending members 58 and 60. The member 58 forms a tongue which is looped around a portion of the frame not shown and is inserted through a transversely disposed slot 62 in the tab member 60. As the tongue is pulled through the slot 62 the projections 64 on the upper surface of the tongue engage the edges of the slot thereby clamping the device to the frame.

It will be understood that the embodiments depicted in FIGURES 7 and 8 are formed of a resilient material similar to that which is utilized in the formation of the devices A and B.

Thus it will be seen that the device is extremely simple in construction, can be readily mounted and demounted by a small child and which will create an appreciable amount of noise when the vehicle is in motion.

In accordance with the patent statutes, we have described the principles of construction and operation of our improvement in noise making attachment for vehicles, and while we have endeavored to set forth the best embodiment thereof, we desire to have it understood that changes may be made within the scope of the following claims without departing from the spirit of our invention.

We claim:

1. A noisemaker for vehicles having a frame and spoked wheels comprising a generally T shaped resilient member having a base and an integral finger projecting substantially perpendicularly from one surface of said base at a locus intermediate the ends thereof and a serrated surface on the opposite surface of said base, attaching means on said one surface of said base on opposite sides of said finger, a connecting element engageable with said attaching means designed to encircle portions of the frame adjacent the spoked wheel and to anchor said T shaped member to the frame with said finger extending into the pathway of the spokes of one of the wheels.

2. The structure as defined in claim 1 and in which said attaching means comprises tabs extending from said base on opposite sides of said finger.

References Cited in the file of this patent

UNITED STATES PATENTS

| | | |
|---|---|---|
| 2,624,156 | Meyer | Jan. 6, 1953 |
| 2,736,136 | Modlin | Feb. 28, 1956 |
| 2,940,215 | Munro | June 14, 1960 |